United States Patent
Fang et al.

(10) Patent No.: US 11,403,481 B2
(45) Date of Patent: Aug. 2, 2022

(54) METHOD FOR LOCALIZATION OF BONE MARROW WHITE BLOOD CELLS BASED ON SATURATION CLUSTERING

(71) Applicant: Hangzhou Zhiwei Information Technology Co., Ltd., Hangzhou (CN)

(72) Inventors: Fengqi Fang, Hangzhou (CN); Qiang Li, Hangzhou (CN); Ju Lu, Hangzhou (CN); Shun Li, Hangzhou (CN); Yongtao Liu, Hangzhou (CN); Jiajia Hu, Hangzhou (CN); Zhen Huang, Hangzhou (CN)

(73) Assignee: Hangzhou Zhiwei Information Technology Co., Ltd., Hangzhou (CN)

( * ) Notice: Subject to any disclaimer, the term of this patent is extended or adjusted under 35 U.S.C. 154(b) by 170 days.

(21) Appl. No.: 16/979,490

(22) PCT Filed: May 22, 2019

(86) PCT No.: PCT/CN2019/087875
§ 371 (c)(1),
(2) Date: Sep. 9, 2020

(87) PCT Pub. No.: WO2019/223706
PCT Pub. Date: Nov. 28, 2019

(65) Prior Publication Data
US 2021/0004640 A1    Jan. 7, 2021

(30) Foreign Application Priority Data
May 22, 2018  (CN) .......................... 201810495118.4

(51) Int. Cl.
*G06K 9/62*  (2022.01)
*G06T 5/00*  (2006.01)
(Continued)

(52) U.S. Cl.
CPC ......... *G06K 9/6223* (2013.01); *G06K 9/6298* (2013.01); *G06T 5/002* (2013.01);
(Continued)

(58) Field of Classification Search
CPC .. G06K 9/6223; G06K 9/6298; G06K 9/6282; G06T 5/002; G06T 5/30;
(Continued)

(56) References Cited

PUBLICATIONS

White blood cells segmentation, Montseny et al, 2004, IEEE (Year: 2004).*

(Continued)

*Primary Examiner* — Jianxun Yang
(74) *Attorney, Agent, or Firm* — Yong Chen; Lin Sun-Hoffman; Liu Chen & Hoffman LLP

(57) ABSTRACT

A saturation clustering-based method for positioning bone marrow white blood cells: first, pre-processing a bone marrow white blood cell image to eliminate partial noise points and simultaneously smooth the image; using K-means clustering to cluster saturation channels of the bone marrow white blood cell image, and select the type of the white blood cells according to a decision tree algorithm; next, eliminating irrelevant areas in a binary image of the white blood cells by means of a morphology processing algorithm, and simultaneously filling in point holes in the white blood cells; and finally, positioning the white blood cells. The present method is simple and effective, and is suitable for a wide range of applications compared to existing threshold-based algorithms, while rendering a final result more accurate by integrating the decision tree algorithm.

5 Claims, 4 Drawing Sheets

(51) Int. Cl.
  *G06T 5/30* (2006.01)
  *G06V 10/34* (2022.01)
  *G06V 10/56* (2022.01)
  *G06V 10/46* (2022.01)

(52) U.S. Cl.
  CPC ............... *G06T 5/30* (2013.01); *G06V 10/34* (2022.01); *G06V 10/56* (2022.01); *G06T 2207/10024* (2013.01); *G06T 2207/20032* (2013.01); *G06T 2207/20182* (2013.01); *G06T 2207/30024* (2013.01); *G06V 10/467* (2022.01)

(58) Field of Classification Search
  CPC . G06T 2207/10024; G06T 2207/20032; G06T 2207/20182; G06T 2207/30024; G06T 7/136; G06T 7/155; G06T 7/194; G06T 7/73; G06T 7/11; G06T 7/0012; G06T 3/4015; G06T 7/62; G06V 10/34; G06V 10/56; G06V 10/467; G06V 20/695
  See application file for complete search history.

(56) References Cited

PUBLICATIONS

Blood Cell Segmentation, Sinha et al, 2002; https://www.researchgate.net/publication/220265846_Blood_Cell_Segmentation_Using_EM_Algorithm (Year: 2002).*

\* cited by examiner

METHOD FOR LOCALIZATION OF BONE MARROW WHITE BLOOD CELLS BASED ON SATURATION CLUSTERING

CROSS-REFERENCE TO RELATED APPLICATIONS

This application is based on and claims the priority of Chinese Patent Application No. 201810495118.4, filed on May 22, 2018, which is incorporated herein by reference in its entirety.

TECHNICAL FIELD

The invention belongs to the field of medical image processing and, more particularly, to a bone marrow white blood cell localization method based on saturation clustering.

BACKGROUND

There are various types of white blood cells in bone marrow, and the color difference of different types of white blood cells after staining is also large. Compared with peripheral blood, the density of white blood cells in the bone marrow is greater, and some patients have cell adhesions in the blood smear. Therefore, the positioning of bone marrow white blood cells has always been a challenging subject. In recent years, experts and a large number of technical personnel have proposed many effective solutions. However, most solutions can only solve specific problems, and there is no general solution that can be applied to most scenarios.

The current localization of bone marrow white blood cells is based on a threshold algorithm that separates white blood cells from the background and red blood cells. For example, Wu et al., "A novel color image segmentation method and its application to white blood cell image analysis" (Signal Processing, 2006 8th International Conference on) uses an Ostu threshold algorithm to segment and locate white blood cells. Ko et al., "Automatic white blood cell segmentation using stepwise merging rules and gradient vector flow snake" (Micron, 2011, 42(7): 695-705) first uses a threshold algorithm to roughly estimate the location of the cell, and then uses the mean shift for further optimization. At the same time, some scholars have proposed other effective schemes, such as the method of applying morphological processing disclosed in the article "White blood cell segmentation using morphological operators and scale-space analysis" (Computer Graphics and Image Processing, 2007: 294-304) by Dorini L B et al. There are also methods such as clustering. However, these methods have certain limitations. For example, in the Ostu threshold algorithm, one of the assumptions is that the area of the background and the area of the foreground are roughly the same. The actual bone marrow digital image may have a large proportion of white blood cells, or no white blood cells, and the color of the white blood cells may be distributed over a large region, even overlapping with darker red blood cells. Therefore, although the threshold can be applied to most digital images, in some special cases this solution may not locate white blood cells very well. The clustering algorithm may also have the same problem when the color distribution of white blood cells is relatively scattered.

SUMMARY

The object of the present invention is to provide a method for localization of bone marrow leukocytes based on saturation clustering, which provides a white blood cell localization algorithm, which has a higher density of white blood cells in the bone marrow, and a cell adhesion phenomenon occurs in blood smears of some patients. The problem is that the area of white blood cells can be selected more precisely.

The present invention is achieved in this way, a method for locating bone marrow white blood cells based on saturation clustering, comprising the following steps:

(1) median filtering the bone marrow white blood cell image to remove some noise;

(2) Color-changing the image of the bone marrow white blood cells, converting the image from the RGB (red, green and blue) channel to the HSV (color, saturation, brightness) channel;

(3) Apply the K-means algorithm to the S-saturation channel, divide it into three parts, select the first part P1 or the first part of the P1+P2 part to get the white blood cell area. The following is the selection step;

(4) Calculate the average value (H1, H2) of the first two parts of the H channel in (3), and calculate the first two parts of (3) according to the mean point (S1, S2) of the first two parts of (3) The area ratio of the area (ratio);

(5) Count the parts of the white blood cells in the multiple images, and record the values of H1-H2, S1-S2 and ratio when recording in the P1 or P2 part;

(6) According to the recorded results in (5), apply the decision tree algorithm to find out the conditions for making the choices;

(7) Morphologically processing the result of (6) to remove the unrelated area while filling the point hole;

(8) Position the white blood cells isolated in (7).

wherein in the step (3), a K-means algorithm is applied to the S (saturation) channel, and the method is divided into three. In part, the first part P1 is likely to be a white blood cell area, the second part P2 may be a red blood cell area or both red blood cells and white blood cells, and the third part P3 is generally a background area, so only need to select P1 or (P1+P2) part. Get the area of white blood cells.

wherein the average value (H1, H2) of the first two partial H channels in (3) is calculated in the step (4). Calculate the mean point (S1, S2) of the first two parts of (3), and calculate the area ratio (ratio) of the first two parts of (3). The calculation formula of H1 is given below:

$$H1=\Sigma(P1.*H)/\Sigma(P1)$$

$$H2=\Sigma(P2.*H)/\Sigma(P2)$$

Where P1 is a binary image, the pixel value belonging to the first part is 1, and the others are 0. a sum of P1 pixel values is $\Sigma(p1)$, P1.*H indicating a result of multiplying pixels at the same position;

Where P1 is a binary image, the pixel value belonging to the first part is 1, and the others are 0. a sum of P1 pixel values is $\Sigma(p2)$, P2.*H indicating a result of multiplying pixels at the same position.

wherein in the step (6), according to the recording result in (5), the decision tree algorithm is applied to find out the rule formulation. The selected condition, in which the loss function of the decision tree algorithm plus the number of leaf nodes, is used for pruning to prevent overfitting.

wherein in the step (7), the result of (6) is subjected to morphological processing to remove an unrelated region and fill the white blood cell region. Point hole, the specific process is as follows: First, select the appropriate structure element b to do the corrosion operation on the binary image obtained in (6), remove the unrelated area, and then do the expansion operation, $$f = f \ominus b$$

$$f = f \oplus b$$

And f is the binary image obtained in (6), which is an expansion operation and is a corrosion operation;

Finally, the point holes in f are filled by morphological reconstruction;

$$g = f$$

$$D_g^{(1)}(f) = (D_g^{(0)} \oplus b) \cap g$$

$$D_g^{(n)}(f) = D_g^{(1)}(D_g^{(n-1)}(f))$$

$D_g^{(1)}(f)$ is the result of a refactoring, ∩ and is.

Compared with the disadvantages and deficiencies of the prior art, the present invention has the following beneficial effects:

1. The algorithm of the invention is simple, effective and has a wide application range. Compared with the existing threshold-based algorithms, the algorithm of the present invention has stronger adaptability.

2. The problem of wide range of color distribution of different types of white blood cells, as well as the dark color of red blood cells caused by dyeing. By combining the K-means algorithm and the decision tree algorithm of the patent of the present invention, the white blood cell region can be selected more accurately.

Whether this part of the advantages can be more specifically described for the white blood cell positioning method used in the background art.

DETAILED DESCRIPTION

The present application will be further described in detail below with reference to the accompanying drawings and embodiments. It is understood that the specific embodiments described herein are merely illustrative of the invention and are not intended to limit the application.

A method for locating bone marrow white blood cells based on saturation clustering, includes the following steps.

Figure 1:
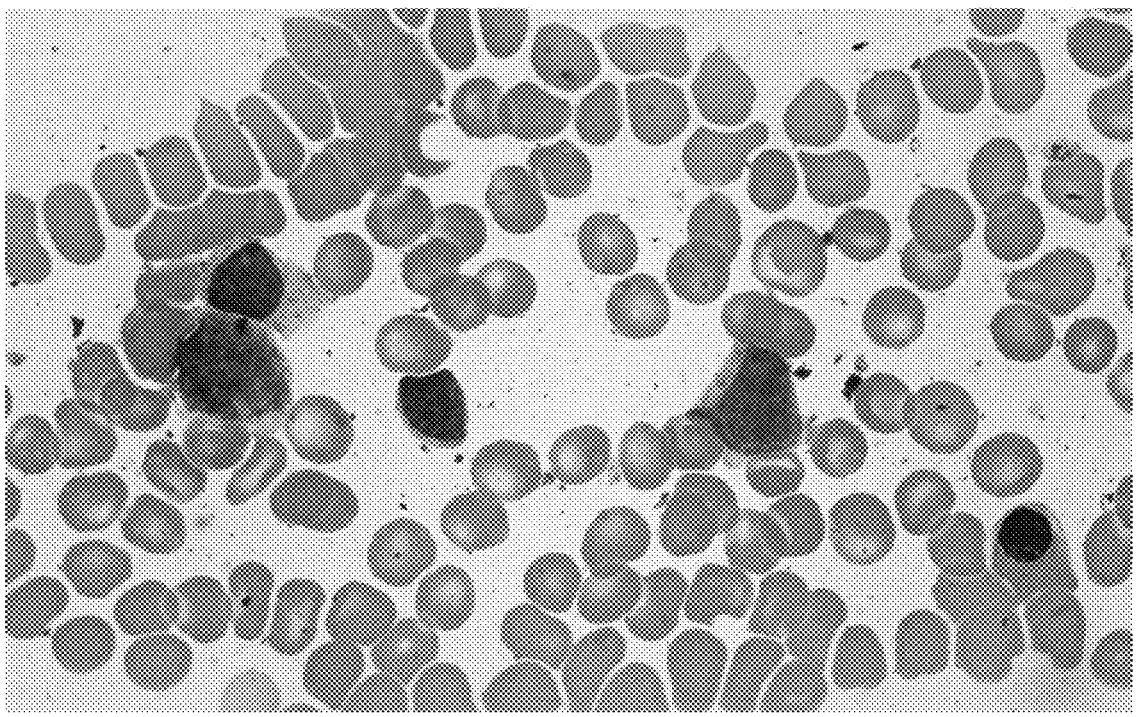
FIG. 1 is an example of a bone marrow white blood cell image.
Figure 2:
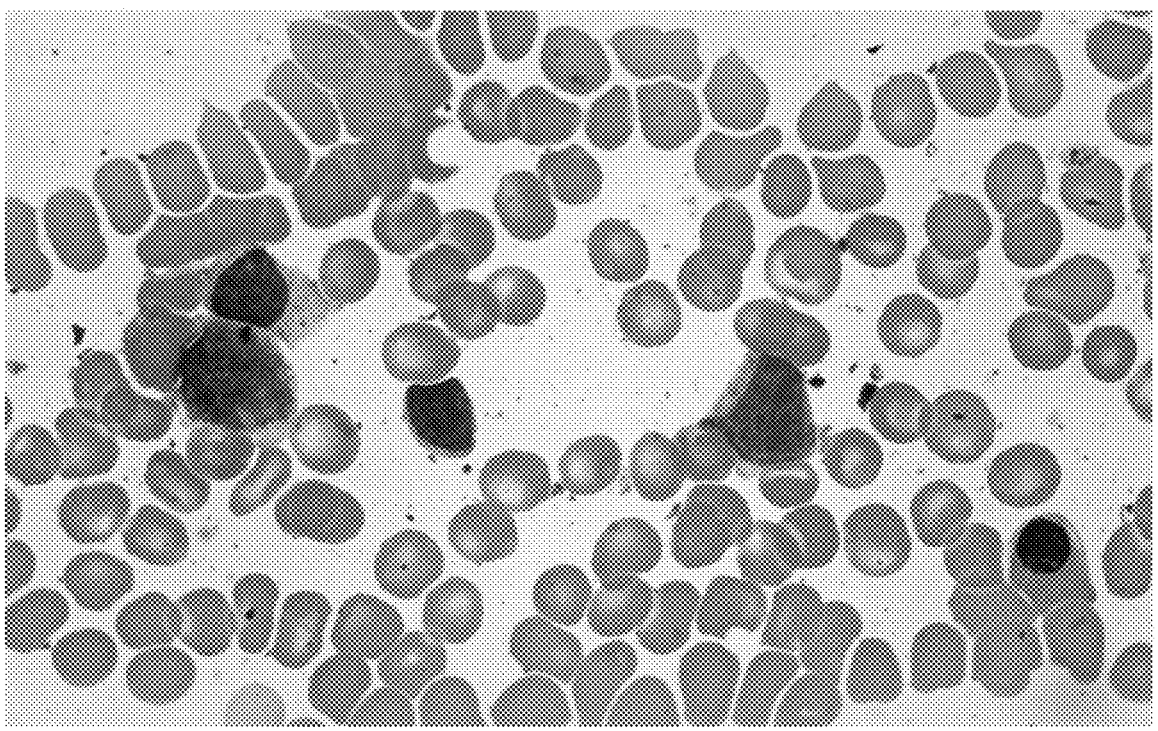
FIG. 2 is a median-filtered image of bone marrow white blood cells, according to an embodiment.

In step (1), median filtering of a bone marrow white blood cell image is performed to remove some noise. FIG. 1 is an example of a bone marrow white blood cell image, and the result of the media filtering of the bone marrow white blood cell image is shown in FIG. 2. In the median filtering, the size of a filtering template may be (5*5).

In step (2), color conversion of the median-filtered bone marrow white blood cell image obtained in step (1) is performed, to convert the median-filtered image from an RGB (red, green, blue) channel to an HSV (color, saturation, brightness) channel. The specific formula used in step (2) is as follows:

$$V = \max(R, G, B)$$

$$S = \begin{cases} \dfrac{V - \min(R, G, B)}{V}, & V \neq 0 \\ 0, & V = 0 \end{cases}$$

$$H = \begin{cases} 60(G - B)(V - \min(R, G, B)), & V = R \\ 120 + 60(B - R)(V - \min(R, G, B)), & V = G \\ 240 + 60(R - G)(V - \min(R, G, B)), & V = B \end{cases}$$

where the range of RGB values is [0, 1].

Figure 3:
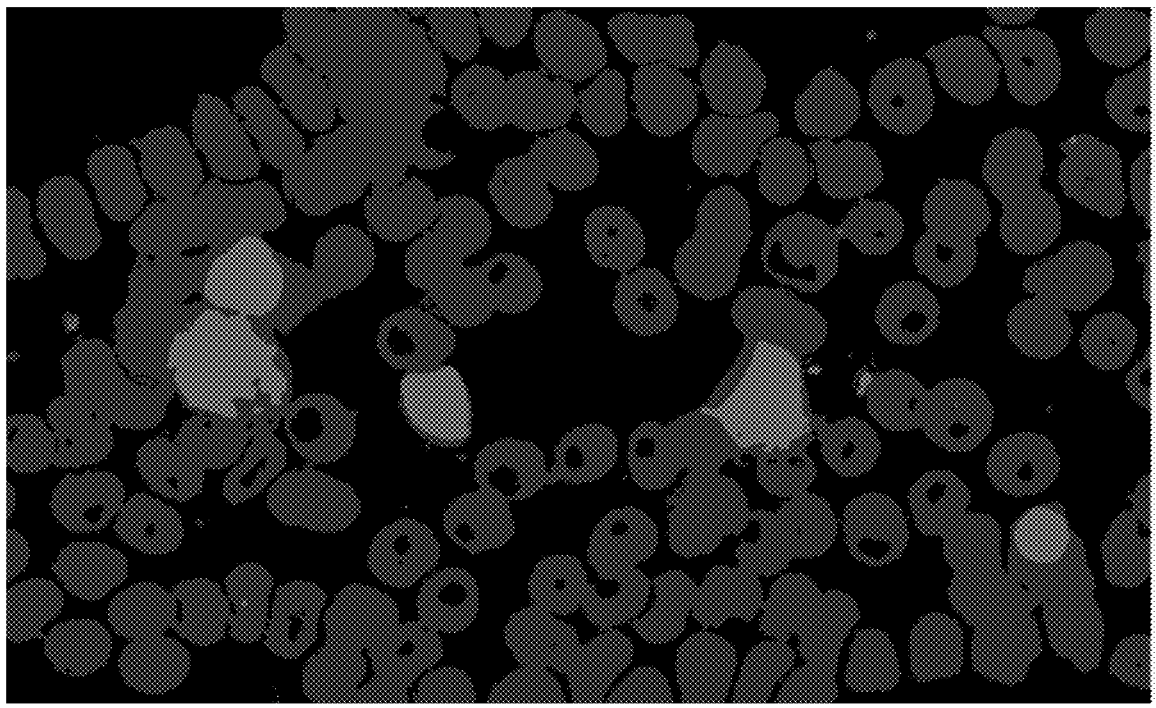
FIG. 3 is a three-part graph resulting from applying a K-means algorithm to an S channel of a color-converted image, according to an embodiment.

In step (3), a K-means algorithm is applied to the S (saturation) channel of the color-converted image, to divide the color-converted image into three parts. FIG. 3 is a three-part image resulting from applying the K-means algorithm to the S channel. As shown in FIG. 3, the first part P1 may be a white blood cell region, the second part P2 may be a red blood cell region or a region including red blood cells and white blood cells, and the third part P3 may generally be a background. Therefore, only the first part P1 or the first and second parts P1+P2 need to be selected to obtain the white blood cell area. The following are the steps of selection.

In step (4), calculate the average values (H1, H2) of the H channel in the first part P1 and the second part P2 in step (3), and calculate the area ratio of first part P1 and the second part P2 in step (3) according to the mean points (S1, S2) of the first part P1 and the second part P2 in step (3). The calculation formula of H1 and H2 is given below:

$$H1 = \Sigma(P1.*H)/\Sigma(P1)$$

$$H2 = \Sigma(P2.*H)/\Sigma(P2)$$

where P1 represents a binary image of the first part P1, the pixel value belonging to the first part P1 being 1, and the others being 0. Σ(P1) represents a sum of pixel values in the first part P1, and P1.*H represents a result of multiplying values of pixels at the same position; and where P2 represents a binary image of the second part P2, the pixel value belonging to the second part P2 being 1, and the others being 0. Σ(P2) represents a sum of pixel values in the second part P2, and P2.*H represents a result of multiplying values of pixels at the same position.

In step (5), a statistical analysis is performed on multiple images to identify first parts and second parts where white blood cells are included, and the values of H1−H2, S1−S2, and area ratios of the identified first parts (P1) and second parts (P2) are recorded. For example, a statistics process is performed on 230 images. In 120 of the 230 images, white blood cells are included in the first part (P1). In 110 of the 230 images, white blood cells are included in the first part and second part (P1+P2). Images with no white blood cells are also collected.

Figure 4:
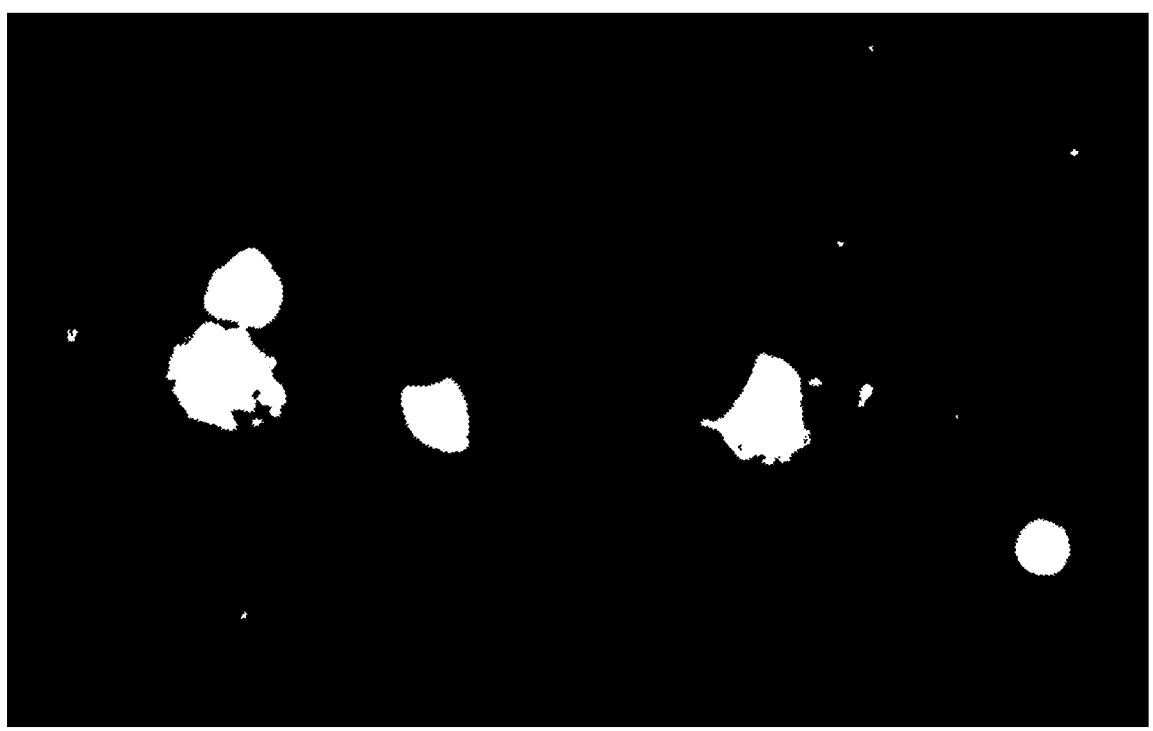
FIG. 4 is an image resulting from applying a decision tree algorithm selection, according to an embodiment.

In step (6), according to the recorded results in step (5), a decision tree algorithm is applied to find out conditions for making selections. The loss function of the decision tree algorithm is added with the number of leaf nodes, to be used for pruning to prevent over-fitting. Then, selections are made on the color-converted image according to the conditions to obtain a binary image. After selection, the result is shown in FIG. 4.

Figure 5:
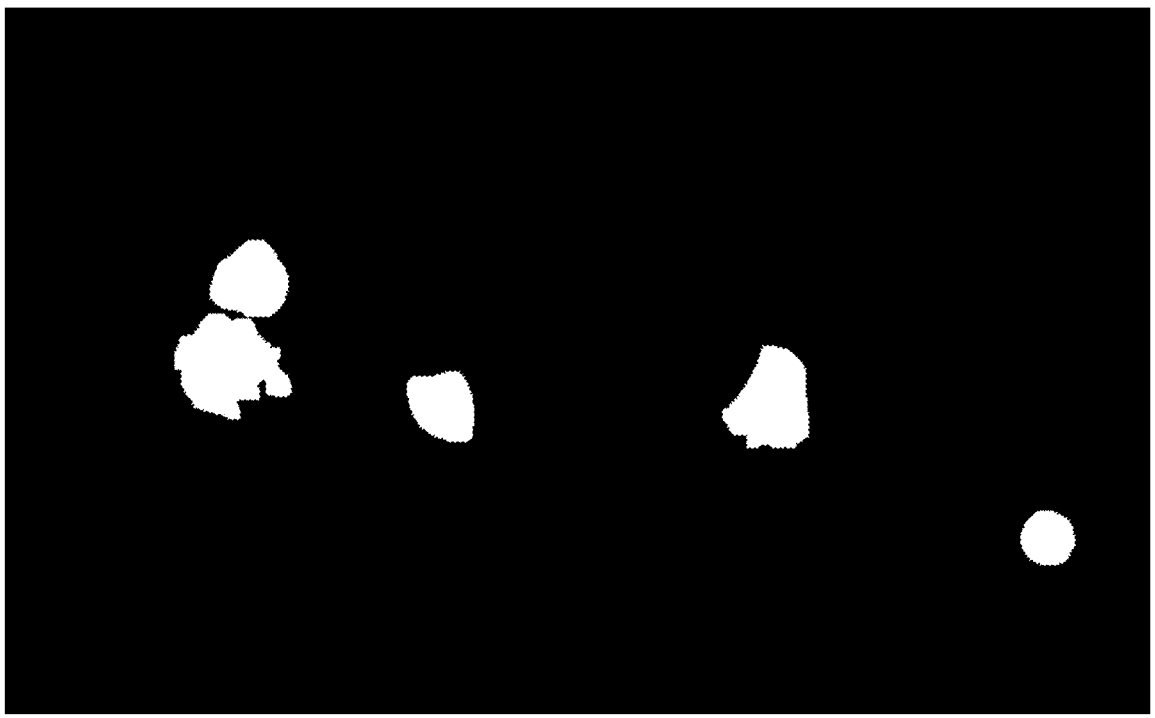
FIG. 5 is an image resulting from removing irrelevant regions and filling point holes, according to an embodiment.

In step (7), the result of step (6) is morphologically processed to remove irrelevant regions and fill point holes in a white blood cell region in the morphologically processed image. The result is shown in FIG. 5. The specific process is as follows.

First, an appropriate structural element b is selected to perform an etching operation on the binary image obtained in (6), remove irrelevant regions, and then perform an expansion operation.

$$f=f\ominus b$$

$$f=f\oplus b$$

where f represents the binary image obtained in step (6), $\oplus$ represents an expansion operation, and $\ominus$ represents an etching operation;

Finally, the point holes in the image f are filled by morphological reconstruction.

$$g=f$$

$$D_g^{(1)}(f)=(D_g^{(0)}\oplus b)\cap g$$

$$D_g^{(n)}(f)=D_g^{(1)}(D_g^{(n-1)}(f))$$

where $D_g^{(1)}(f)$ represents the result of a reconstruction, and $\cap$ represents an AND operation.

After the morphologically processing and filling point holes, white blood cells are isolated from the image.

Figure 6:
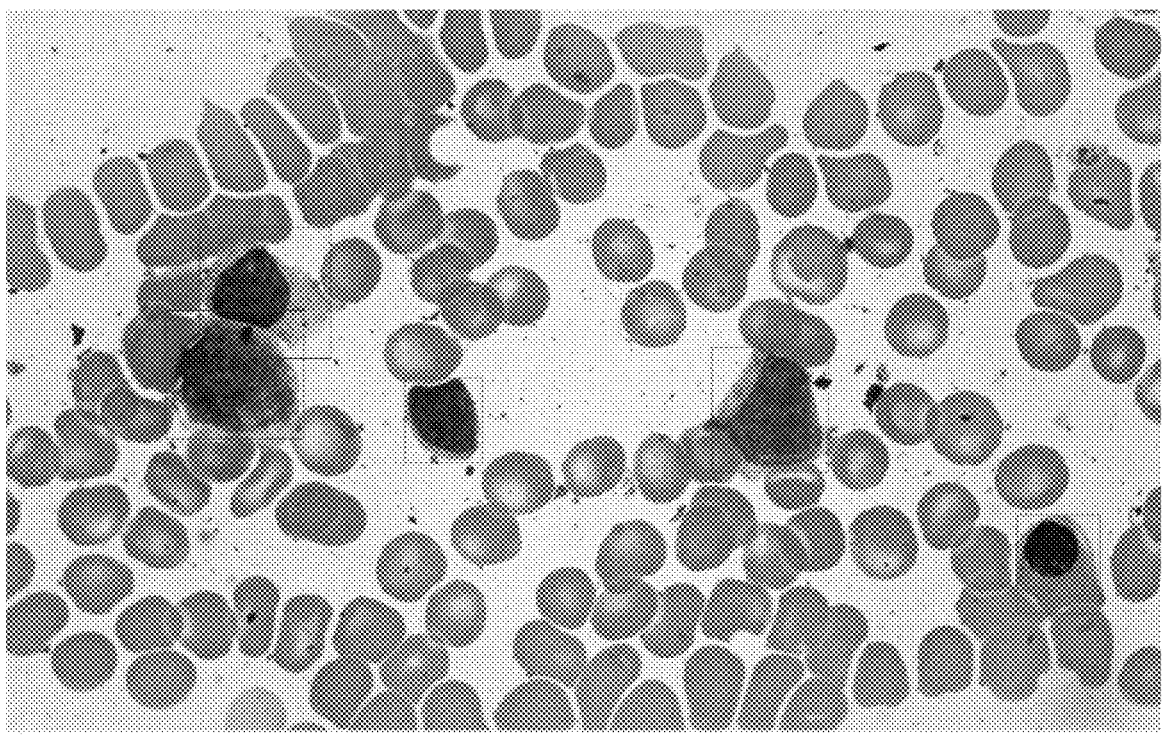
FIG. 6 is an image resulting from locating white blood cells after separation, according to an embodiment.

In step (8), the white blood cells isolated in step (7) are located, and the results are shown in FIG. 6.

Figure 7:
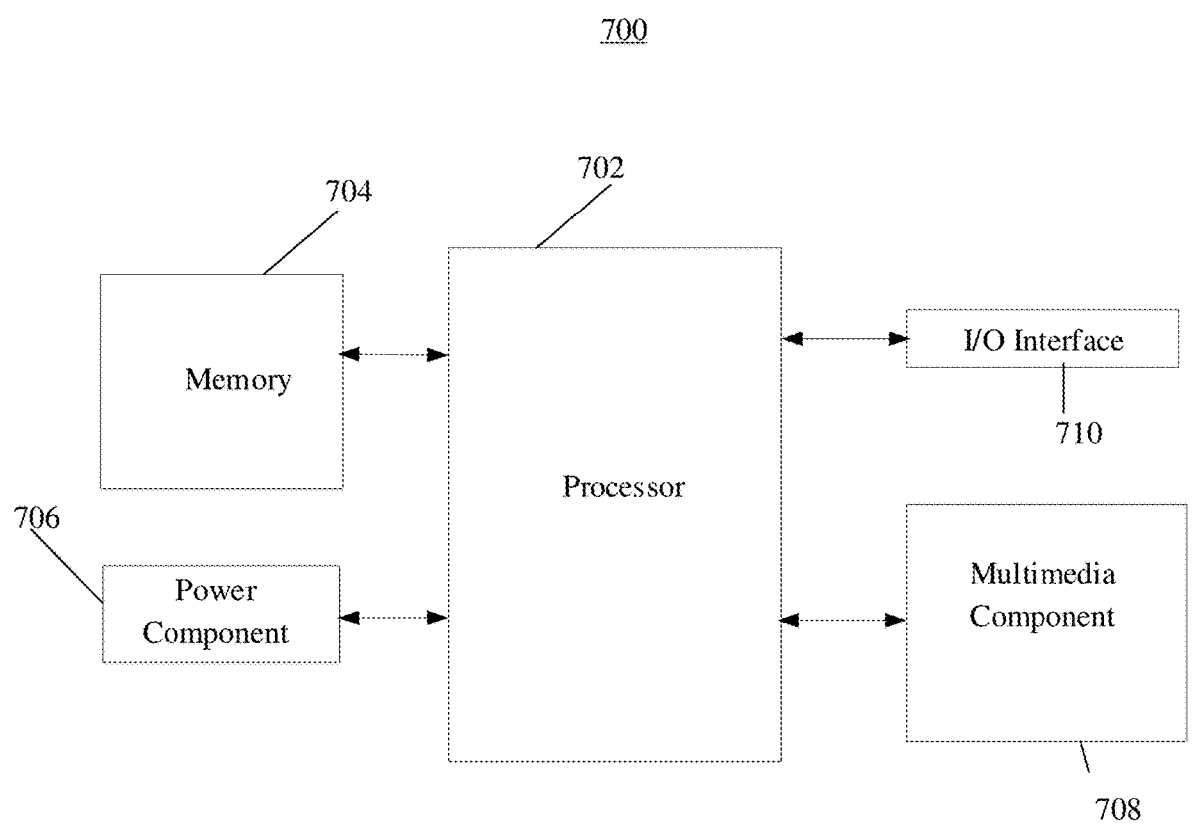
FIG. 7 is a schematic block diagram of a device for locating bone marrow white blood cells, according to an embodiment.

FIG. 7 is a block diagram of a device 700 for locating bone marrow white cells, according to an embodiment. For example, the device 700 may be a computer, a cloud server, and the like.

Referring to FIG. 7, the device 700 includes one or more of the following components: a processor 702, a memory 704, a power component 706, a multimedia component 708, an Input/Output (I/O) interface 710.

The processor 702 is configured to control overall operations of the device 700, such as the operations associated with locating bone marrow white cells. The processor 702 is configured to execute instructions to perform all or part of the disclosed methods. In some embodiments, the processor 702 includes a multimedia module configured to facilitate the interaction between the multimedia component 708 and the processor 702.

The memory 704 is configured to store various types of data to support the operation of the device 700. Examples of such data include instructions for any applications or methods implemented by the device 700, cell images, database, etc. The memory 704 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, or a magnetic or optical disk.

The power component 706 is configured to provide power to various components of the device 700. The power component 706 includes a power management system, one or more power sources, and any other components associated with the generation, management, and distribution of power in the device 700.

The multimedia component 708 includes a screen providing an output interface between the device 700 and a user of the device 700. In some embodiments, the screen may include a liquid crystal display and a press panel.

The I/O interface 710 is configured to provide an interface for the processor 702 and peripheral interface modules, such as a keyboard, a click wheel, buttons, and the like.

In some embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the disclosed methods.

The present disclosure also provides a non-transitory computer-readable storage medium including instructions, such as included in the memory 704. The instructions are executable by the processor 702 of the device 700, for performing the disclosed methods of locating bone marrow white cells. For example, the non-transitory computer-readable storage medium may be a ROM, a RAM, a CD-ROM, a magnetic tape, a floppy disc, an optical data storage device, and the like.

The above-described saturation clustering-based bone marrow white cell localization method has the advantages of simple, effective, and wide application range. Compared with the existing threshold-based algorithm, the algorithm of the embodiment has stronger adaptability. Secondly, the application of K-means algorithm and decision tree algorithm can more accurately select the white blood cell area.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for locating bone marrow white blood cells, comprising the steps of:
    (1) median filtering a bone marrow white blood cell image to remove some noise;
    (2) color-converting the median-filtered bone marrow white blood cell image from an RGB (red, green and blue) channel to an HSV (color, saturation, brightness) channel;
    (3) applying a K-means algorithm to an S-saturation channel, dividing the color-converted image into three parts, and selecting a first part or a first part and a second part to obtain a white blood cell area;
    (4) calculating average values (H1, H2) of an H channel in the first part and the second part obtained in step (3), and calculating the area ratio of the first part and the second part according to mean points (S1, S2) of the first part and the second part;
    (5) performing a statistical analysis on multiple images to identify first parts and second parts where white blood cells are included, and recording the values of H1–H2, S1–S2, and area ratios of the identified first parts and the second parts;

(6) according to the recorded results in step (5), applying a decision tree algorithm to find out conditions for making selections, and making selections on the color-converted image according to the conditions to obtain a binary image;

(7) morphologically processing the result of step (6) to remove irrelevant regions, filling point holes in a white blood cell region in the morphologically processed image, and isolating white blood cells from the image; and (8) locating the white blood cells isolated in step (7).

2. The method according to claim 1, wherein in the three parts in step (3), the first part is a white blood cell region, the second part is a red blood cell region or a region including both red blood cells and white blood cells, and the third part is a background.

3. The method according to claim 1, wherein the calculation formula of H1 is given below:

$$H1=\Sigma(P1.*H)/\Sigma(P1)$$

$$H2=\Sigma(P2.*H)/\Sigma(P2)$$

where P1 represents a binary image of the first part, the pixel value belonging to the first part being 1, and the others being 0, $\Sigma(P1)$ represents a sum of pixel values in the first part, and P1.*H represents a result of multiplying values of pixels at the same position, and where P2 represents a binary image of the second part, the pixel value belonging to the second part being 1, and the others being 0, $\Sigma(P2)$ represents a sum of pixel values in the second part, and P2.*H represents a result of multiplying values of pixels at the same position.

4. The method according to claim 1, wherein in step (6), a loss function of the decision tree algorithm is added with the number of leaf nodes, to be used for pruning to prevent over-fitting.

5. The method according to claim 1, wherein step (7) includes:

selecting an appropriate structure element b to perform an etching operation on the binary image obtained in step (6), removing the irrelevant regions, and performing an expansion operation, wherein the etching operation and the expansion operation are represented by the following formula:

$$f=f\ominus b$$

$$f=f\oplus b$$

where f represents the binary image obtained in step (6), $\oplus$ represents an expansion operation, and $\ominus$ represents an etching operation; and filling the point holes in the image by morphological reconstruction, where the filing is represented by the following formula:

$$g=f$$

$$D_g^{(1)}(f)=(D_g^{(0)}\oplus b)\cap g$$

$$D_g^{(n)}(f)=D_g^{(1)}(D_g^{(n-1)}(f))$$

where $D_g^{(1)}(f)$ represents the result of a reconstruction, and $\cap$ represents an AND operation.

* * * * *